United States Patent

DeFrank et al.

[11] Patent Number: 5,957,391
[45] Date of Patent: Sep. 28, 1999

[54] DRIP IRRIGATION HOSE WITH SELF-CLEANING INLET AND METHOD FOR ITS MANUFACTURE

[75] Inventors: Michael DeFrank, Temecula; Que Tran, San Diego, both of Calif.

[73] Assignee: T-Systems International, Inc., San Diego, Calif.

[21] Appl. No.: 09/036,326

[22] Filed: Mar. 6, 1998

Related U.S. Application Data

[60] Provisional application No. 60/040,259, Mar. 7, 1997.

[51] Int. Cl.$^6$ .......................... B05B 15/00; B05B 15/02; B29C 53/00
[52] U.S. Cl. .......................... 239/542; 239/562; 239/566; 239/106; 156/203; 156/252; 156/466; 156/513
[58] Field of Search .................................. 239/106, 542, 239/562, 566, 568; 156/203, 252, 466, 513

[56] References Cited

U.S. PATENT DOCUMENTS

| | | | |
|---|---|---|---|
| 4,642,152 | 2/1987 | Chapin | 156/203 |
| 4,984,739 | 1/1991 | Allport | 239/542 X |
| 5,118,042 | 6/1992 | Delmer | 239/542 |
| 5,123,984 | 6/1992 | Allport et al. | 239/542 X |
| 5,282,578 | 2/1994 | De Frank | 239/542 |
| 5,522,551 | 6/1996 | De Frank et al. | 239/542 |
| 5,722,601 | 3/1998 | De Frank et al. | 239/542 |
| 5,732,887 | 3/1998 | Roberts | 239/542 |

Primary Examiner—Andres Kashnikow
Assistant Examiner—Steven J. Ganey
Attorney, Agent, or Firm—Christie, Parker & Hale, LLP

[57] ABSTRACT

A self cleaning drip irrigation hose comprising an elongated strip of plastic film folded longitudinally to form first and second overlapping longitudinal margins. A first longitudinal bead partially seals the overlapping margin. A second longitudinal bead outboard of the first bead partially seals the overlapping margins. The first and second beads have a repeating longitudinal pattern that forms a flow regulating channel and opposing inlets spaced along the length of the first and second beads. Outlets from the flow regulating channel to the exterior of the hose are spaced from the inlets to create a pressure drop across the flow regulating channel. A third longitudinal bead outboard of the second bead completely seals the overlapping margin. The second and third beads form a water access channel to the inlets in the second bead such that the inlets in the first bead when plugged are back flushed by water flow through the inlets in the second bead. The hose is made by extruding one or more molten beads on one of the margins and shaping the beads with a molding wheel.

17 Claims, 3 Drawing Sheets

DRIP IRRIGATION HOSE WITH SELF-CLEANING INLET AND METHOD FOR ITS MANUFACTURE

RELATED APPLICATION

This application claims the benefit of the filing date of provisional Application No. 60/040,259 filed Mar. 7, 1997, the disclosure of which is incorporated fully herein.

BACKGROUND OF THE INVENTION

This invention relates to drip irrigation hose and more particularly to a drip irrigation hose having self-cleaning inlets and a method for manufacturing such a hose.

U.S. Pat. No. 5,123,984 to Allport et al. discloses a drip irrigation hose made from an elongated strip of plastic film folded longitudinally to form overlapping longitudinal margins. Molded plastic beads seal the overlapping margins and form a flow regulating channel for water exiting the drip irrigation hose. The characteristics of the flow regulating channel, the inlets to the channel, and/or the outlets from the channel are determined by the pattern on a molding wheel that shapes a bead extruded on one margin of the film.

In a prior art design disclosed in U.S. Pat. No. 5,003,726 to Allport the flow regulating channel is formed by a pair of parallel rib forming beads in the overlapping margins. Inlets to the flow regulating channel are formed by interruptions in the inboard bead. Outlets from the hose are formed in the outboard bead or the film itself. There is a tenancy in some soil conditions for the inlets to become plugged as debris in the water builds up at the entrance to the flow regulating channel, which reduces the drip flow rate through the portion of the flow regulating channel fed by the plugged inlets.

SUMMARY OF THE INVENTION

One aspect of the invention is a self cleaning drip irrigation hose comprising an elongated strip of plastic film folded longitudinally to form first and second overlapping longitudinal margins. A first longitudinal bead partially seals the overlapping margin. A second longitudinal bead outboard of the first bead partially seals the overlapping margins. The first and second beads have a repeating longitudinal pattern that forms a flow regulating channel and opposing inlets spaced along the length of the first and second beads. Outlets from the flow regulating channel to the exterior of the hose are spaced from the inlets to create a pressure drop across the flow regulating channel. A third longitudinal bead outboard of the second bead completely seals the overlapping margin. The second and third beads form a water access channel to the inlets in the second bead such that the inlets in the first bead when plugged are back flushed by water flow through the inlets in the second bead.

Another aspect of the invention is a method for manufacturing a drip irrigation hose having self-cleaning inlets. A continuous length of plastic film having longitudinal margins is transported past a number of assembly stations. At a first assembly station outlets are formed at regular intervals in the margins. At a second assembly station one or more continuous molten beads of compatible plastic are extruded onto the length of film in the other margin. At a third station, the one or more molten beads are shaped into first, second, and third longitudinal beads. The first and second beads have a repeating longitudinal pattern that forms a flow regulating channel and opposing inlets spaced along the length of the first and second beads. The third bead extends continuously along the length of the film outboard of the first and second beads to form a water access channel with one of the other beads. At a fourth station the film is folded longitudinally so the margins overlap each other. Finally, at a fifth station the molded beads are pressed together to seal the margins.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

Figure 1:
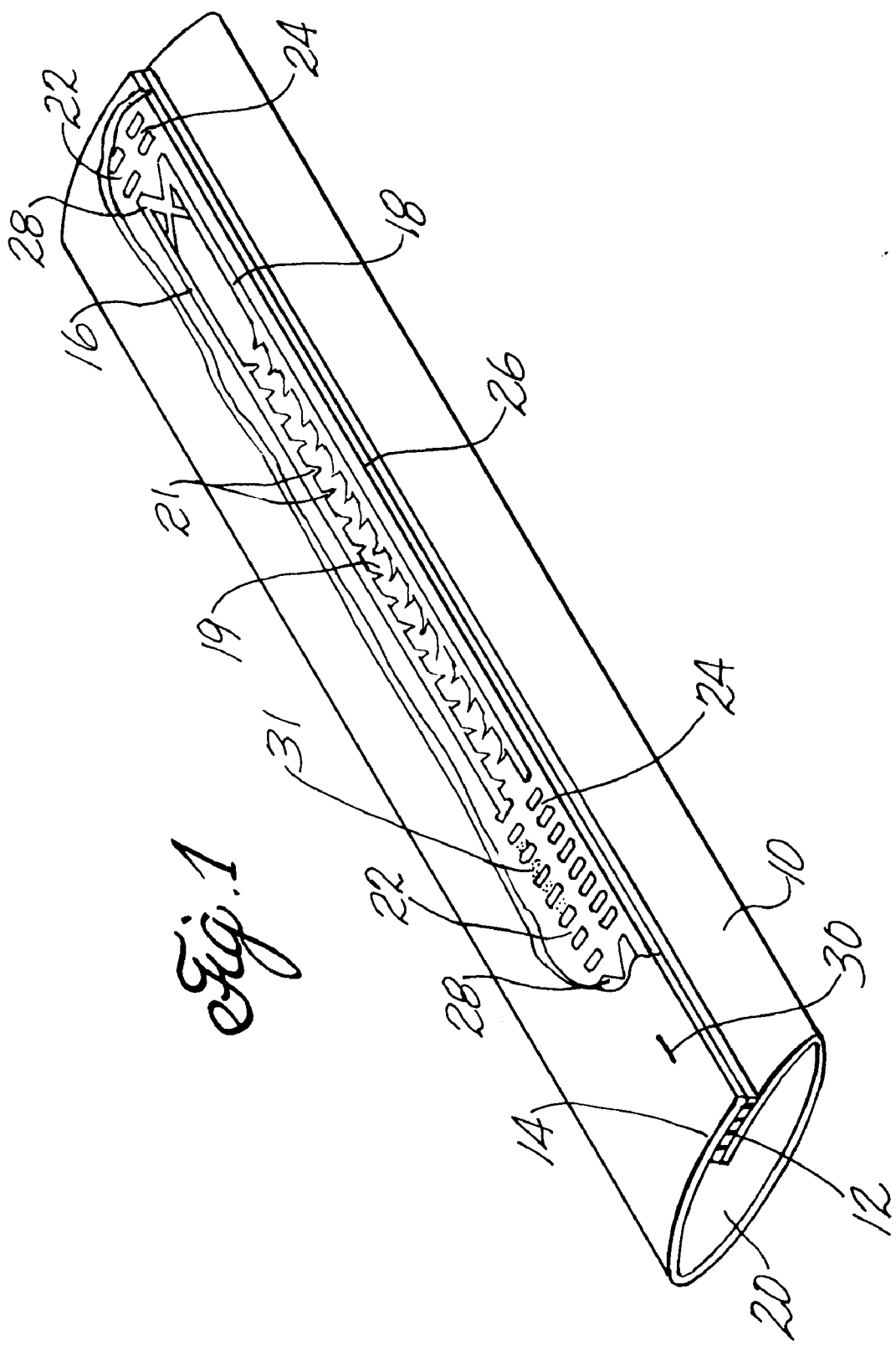
FIG. 1 is a prospective view of a length of drip irrigation hose partially cut away to show the features of the invention.

In FIG. 1 an elongated strip of plastic film 10 which is typically 4–15 mil thick is folded longitudinally to form overlapping longitudinal margins 12 and 14. A longitudinal bead 16 partially seals margins 12 and 14. A longitudinal bead 18 outboard of bead 16 also partially seals margins 12 and 14. Beads 16 and 18 have a repeating longitudinal pattern, slightly more than one repetition of which is shown in FIG. 1. Beads 16 and 18 define a small flow regulating channel 19. By virtue of the longitudinal fold in strip 10, the interior surface of strip 10 defines a relatively large water flow passage 20, which is connected to a source of water under pressure. A series of interruptions in bead 16 form an inlet 22 from water supply passage 20 to flow regulating channel 19. A series of interruptions in bead 18 form another inlet 24 from water supply passage 20 to flow regulating channel 19. A bead 26 outboard of bead 18 completely seals margins 12 and 14, i.e., there are no interruptions in bead 18. As shown in FIG. 1, beads 16, 18, and 26 run parallel to each other along the length of strip 10 between margins 12 and 14. Beads 18 and 26 form a water access channel to inlets 24. Interlaced chevrons 21 are formed on the facing surfaces of beads 16 and 18 to induce turbulence in flow regulating channel 19. A cross seal 28 extends between beads 16 and 18 adjacent to inlets 22 and 24 to divide flow regulating channel 19 into mutually isolated sections. Knife blade formed slits 30 serve as outlets from flow regulating channel 19. As shown, each of outlet slits 30 is spaced from inlets 22 and 24 so as to create an outlet along channel 19. It is emphasized that the described pattern formed by beads 16 and 18, inlets 22 and 24, cross seals 28, and outlet slits 30 is repeated throughout the length of strip 10.

When debris builds up at the bead interruptions that form inlet 22, as represented by the shading at 31, more of the water flow into channel 19 is shifted to inlet 24. Such water flow through inlet 24 tends to back flush and thus unplug inlet 22. As a result, the inlet system to flow regulating channel 19 is self-cleaning.

Figure 2:
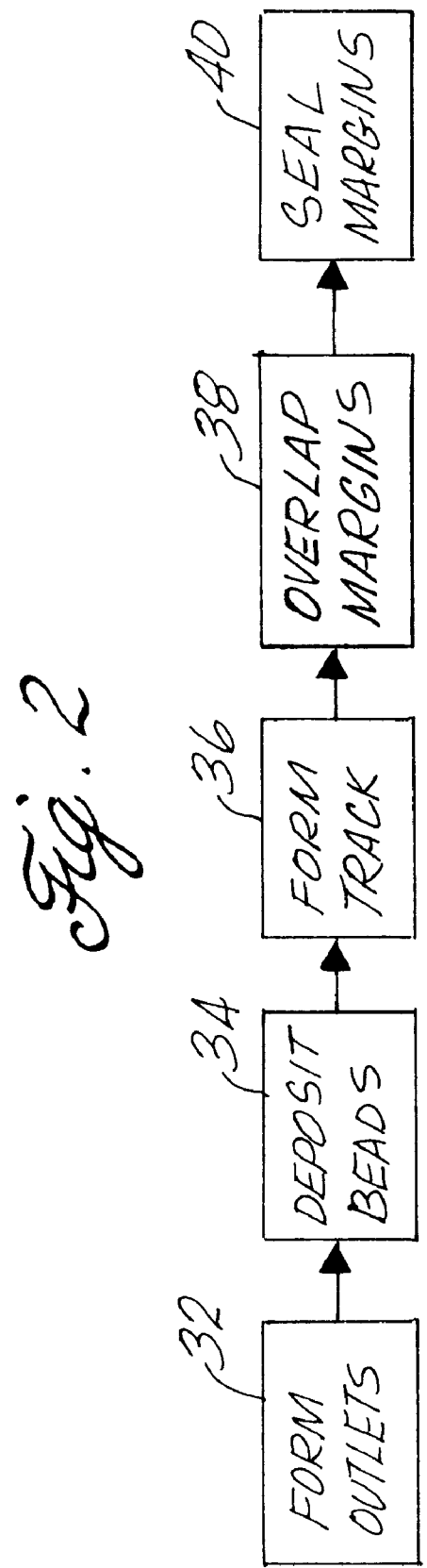
FIG. 2 is a schematic block diagram of the method for making the drip irrigation hose in FIG. 1 and, FIG. 3 is a perspective view of a number of the assembly stations represented schematically in FIG. 2.

Reference is made to FIG. 2 for a description of the method for manufacturing the drip irrigation hose described in connection with FIG. 1. The described drip irrigation hose is made from a continuous strip of flexible, water impervious plastic film, generally ranging in thickness between 4 and 15 mil. Blocks in FIG. 2 represent the different product assembly stations through which film 42 is transported during manufacture. As depicted by a block 32, outlets are formed in the strip of film along the outer margin. Each outlet comprises a single longitudinal slit in the film. Reference is made to DeFrank et al U.S. Pat. No. 5,522,551 for a description of the preferred method and apparatus for forming the outlet slits. Although it is preferred to form the outlets as slits, they could be holes instead. Next, as depicted by a block 34, two molten plastic beads made of material compatible with the film are deposited by an extruder on the inner margin of the film on both sides of the outlet slits. Next, as depicted by a block 36, the track pattern of the beads described in FIG. 1 is formed in the molten beads by the impressions on a bead forming wheel. The track pattern is repeated each time the bead forming wheel completes a revolution. As depicted by a block 38, after the beads are formed, the margins of the film are folded to overlap the track pattern therebetween. Finally, as depicted by a block 40, the overlapping margins are sealed by the still molten beads to form the finished hose. The described steps, except for formation of the outlets, are shown in more detail in the referenced '984 patent.

Figure 3:
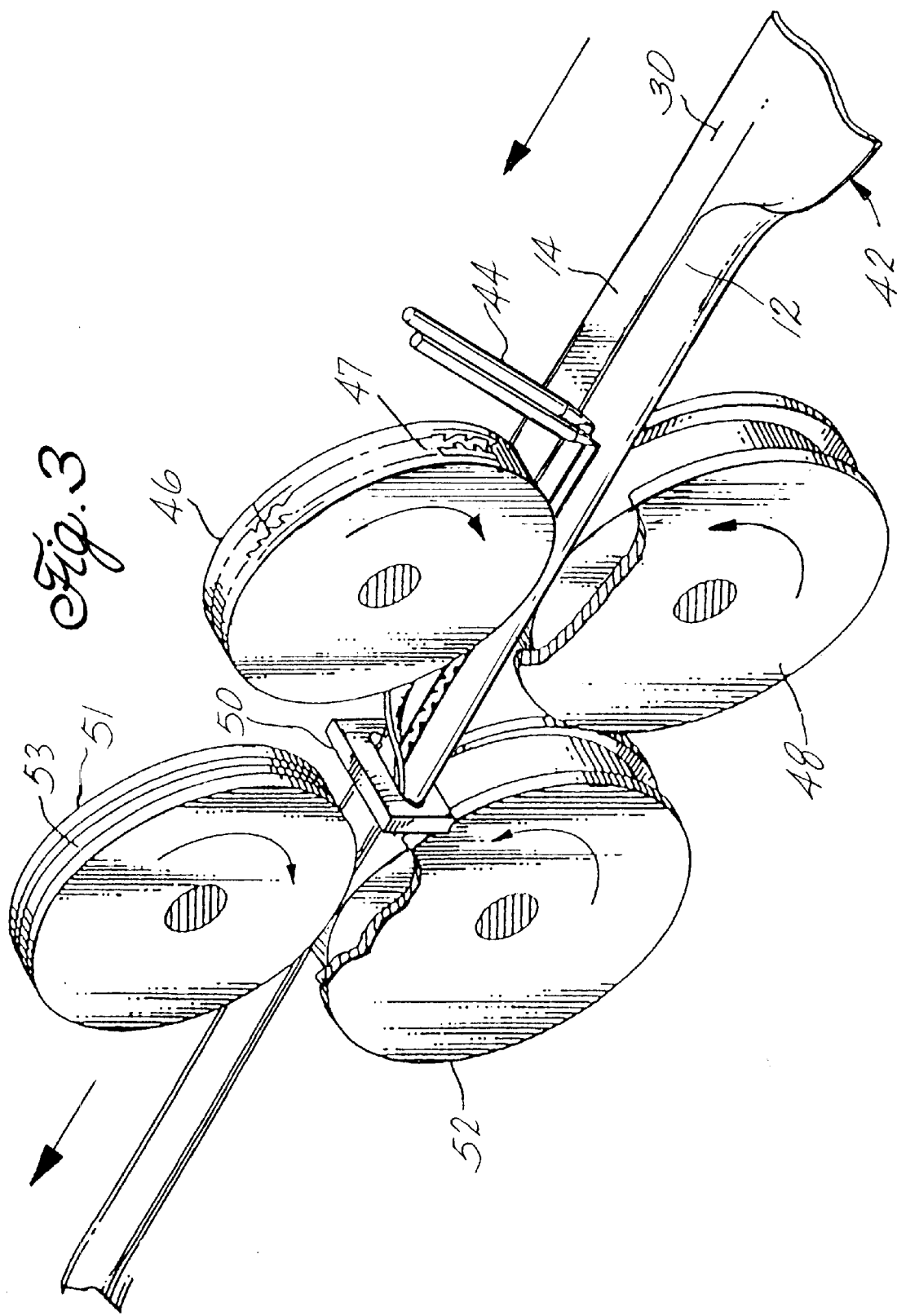

Reference is made to FIG. 3 for a detailed description of the stations represented by blocks 34 to 40. Plastic strip 10 in FIG. 1 is part of a continuous length of plastic film 42 having an inner margin 12 and an outer margin 14. The direction of movement of film 42 is depicted by arrows. At the point shown in FIG. 3, outlet slits 30 have already been formed in outer margin 14. First, inner margin 12 of film 42 is folded down onto the middle of film 42 by a film guide (not shown) so the outer surface of inner margin 12 faces upwardly. Then, film 42 passes under extruder nozzles 44, which deposit on inner margin 12 two beads 45 of molten plastic material that is compatible with the material of film 42. Next, film 42 passes into the nip formed by the adjacent peripheries of a molding wheel 46 and a backing wheel 48. Molding wheel 46 has, around its periphery, impressions 47 that define the desired track pattern. After the track pattern is formed, film 42 passes through a film guide 50 that folds outer margin 14 down over inner margin 12 and the molten molded beads. As a final step, the overlapping film 42 passes through the nip of a form wheel 51 and a backing wheel 52. Form wheel 51 has a groove 53 that depresses the beads formed by extruders 44 and wheel 46 to set the bead height at a specified value that determines the flow rate of the hose.

The described embodiment of the invention is only considered to be preferred and illustrative of the inventive concept; the scope of such invention is not to be restricted to such embodiment. Various and numerous other arrangements may be devised by one skilled in the art without departing from the spirit and scope of this invention. For example, the outlets could be formed as holes or interruptions in the outboard bead as in the '984 patent. Other flow regulating channel configurations could be used as in the DeFrank U.S. Pat. No. 5,333,793. Or two inlets could feed a one outlet without a cross seal as in DeFrank et al application Ser. No. 08/683,604, filed on Jul. 15, 1996, now U.S. Pat. No. 5,722,601.

What is claimed is:

1. A drip irrigation hose comprising:
    an elongated strip of plastic film folded longitudinally to form first and second overlapping longitudinal margins;
    a first longitudinal bead partially sealing the overlapping margins;
    a second longitudinal bead outboard of the first bead partially sealing the overlapping margins;
    the first and second beads having a repeating longitudinal pattern that forms a flow regulating channel and opposing inlets;
    outlets from the flow regulating channel to the exterior of the hose spaced from the inlets to create a pressure drop; and
    a third longitudinal bead outboard of the second bead totally sealing the overlapping margins, the second and third beads forming a water access channel to the inlets in the second bead such that the inlets in the first bead are back flushed when plugged by flow through the inlets in second bead.

2. The drip irrigation hose of claim 1, in which the opposing inlets are formed by series of interruptions in the first and second beads.

3. The drip irrigation hose of claim 2, in which the repeating longitudinal pattern additionally forms a cross seal between the first and second beads adjacent to each of the opposing inlets and the outlets are separated from the opposing inlets by the respective cross seals.

4. The drip irrigation hose of claim 3, in which the flow regulating channel has turbulence inducing chevrons.

5. The drip irrigation hose of claim 4, in which the outlets are knife formed slits.

6. The drip irrigation hose of claim 1, in which the opposing inlets are formed by series of interruptions in the first and second beads.

7. The drip irrigation hose of claim 1, in which the repeating longitudinal pattern additionally forms a cross seal between the first and second beads adjacent to each of the opposing inlets and the outlets are separated from the opposing inlets by the respective cross seals.

8. The drip irrigation hose of claim 1, in which the flow regulating channel has turbulence inducing chevrons.

9. The drip irrigation hose of claim 1, in which the outlets are knife formed slits.

10. A method of manufacturing a drip irrigation hose comprising the steps of:
    transporting a continuous length of plastic film having longitudinal margins;
    forming outlets at regular intervals in one of the margins during transport;
    extruding one or more continuous molten beads of compatible plastic onto the length of film along the other margin during transport;
    molding the one or more molten beads during transport into first and second longitudinal beads having a repeating longitudinal pattern that forms a flow regulating channel and opposing inlets and a third continuous longitudinal bead outboard of the first and second beads that forms a water access channel with one of the other beads;
    folding the film longitudinally during transport so the margins overlap each other; and
    pressing the molded beads together during transport to seal the margins.

11. The method of claim 10, in which the outlet forming step comprises cutting the film with a knife blade at regular intervals.

12. The method of claim 11, in which the molding step molds the one or more molten beads into a pattern in which the opposing inlets are formed by series of interruptions in the beads.

13. The method of claim 12, in which the molding step additionally molds the one or more molten beads into a pattern that forms a cross seal between the first and second beads adjacent to each of the opposing inlets and the outlets are separated from the opposing inlets by the respective cross seals.

14. The method of claim 13, in which the molding step additionally molds the one or more molten beads into a pattern in which the regulating channel has turbulence inducing chevrons.

15. The method of claim 10, in which the molding step molds the one or more molten beads into a pattern in which the opposing inlets are formed by series of interruptions in the beads.

16. The method of claim 10, in which the molding step additionally molds the one or more molten beads into a pattern that forms a cross seal between the first and second beads adjacent to each of the opposing inlets and the outlets are separated from the opposing inlets by the respective cross seals.

17. The method of claim 10, in which the molding step additionally molds the one or more molten beads into a pattern in which the regulating channel has turbulence inducing chevrons.

* * * * *